United States Patent [19]

Wawra et al.

[11] Patent Number: 4,502,746

[45] Date of Patent: Mar. 5, 1985

[54] ELECTRICALLY CONDUCTING CONNECTOR FOR MUTUALLY ROTATABLE COMPONENTS

[75] Inventors: Helmut Wawra, Korb; Wolfgang Schuliers, Weinstadt, both of Fed. Rep. of Germany

[73] Assignee: Daimler-Benz Aktiengesellschaft, Stuttgart, Fed. Rep. of Germany

[21] Appl. No.: 362,053

[22] Filed: Mar. 26, 1982

[30] Foreign Application Priority Data

Mar. 26, 1981 [DE] Fed. Rep. of Germany ....... 3111922

[51] Int. Cl.³ .......................................... H01R 39/00
[52] U.S. Cl. ................. 339/3 S; 339/5 RL; 339/6 RL; 339/8 RL
[58] Field of Search ............ 339/3 R, 3 S, 5 R, 5 RL, 339/6 R, 6 RL, 8 R, 8 RL

[56] References Cited

U.S. PATENT DOCUMENTS

| | | | |
|---|---|---|---|
| 2,200,794 | 5/1940 | Krantz | 339/8 R X |
| 3,525,536 | 8/1970 | Pruneski | 339/3 S |
| 3,649,946 | 3/1972 | Frowein | 339/8 R |
| 3,763,455 | 10/1973 | Confer et al. | 339/3 S |
| 4,183,598 | 1/1980 | Aarninkhot | 339/6 R |

Primary Examiner—Z. R. Bilinsky
Attorney, Agent, or Firm—Craig & Burns

[57] ABSTRACT

An electrically conducting connector for mutually rotatable components such as, for example, components of steering assemblies of a motor vehicle wherein, in order to obtain a high operating realiability and a transmission of current from the rotatable parts to fixed parts, in lieu of conventional slip ring arrangements, spiral springs are provided which are connected, in an electrically conducting manner to the rotatable component and fixed component of the steering assembly. In order to ensure an exact central positioning during an installation of the spiral springs, end regions of each of the spiral springs rest slidably, under tension, against associated contact rings thereby resulting in an automatic centering of the spiral springs when the steering assembly is operated for the first time.

4 Claims, 4 Drawing Figures

ELECTRICALLY CONDUCTING CONNECTOR FOR MUTUALLY ROTATABLE COMPONENTS

The present invention relates to a connector arrangement and, more particularly, to an electrically conducting connector for mutually rotatable components, especially components of a motor vehicle steering assembly, wherein at least one spiral spring is located in a housing and is fashioned of an electrically conductive material, with the housing being of a bipartite construction including a first housing part equipped with a core serving for a winding of the spiral spring. One housing part of the bipartite housing is adapted to be connected in a rotation proof manner to a shaft so as to be rotated therewith and the other housing part being fixedly arranged with respect to the rotatable housing part. One end of the spiral spring is connected to the core of the first housing part with the other end of the spiral spring being connected to the second housing part.

The use of electrically conducting connectors of the aforementioned type is especially advantageous when it is necessary to guarantee an operating reliability which cannot be ensured by, for example, conventional constructed slip-ring arrangements. Such situations may arise, for example, when it is necessary to provide a triggering current for an airbag installation which current must be transmitted through the steering wheel arrangement of a motor vehicle.

Several disadvantages or difficulties are encountered in an installation of an electrically conducting connector of the aforementioned type. More particularly, if four turns of the steering wheel are assumed, that is to say two to the right and two to the left from a central position, the spiral spring must be constructed so that five to six working turns are possible so as to compensate for tolerances. If the steering wheel is placed in a central position for installing a transmitting unit for, for example, an airbag installation, then the transmitting unit must also necessarily have to be installed in a central position. The central position may be determined by winding the spiral spring on the core until it locks by appropriately rotating the inner housing part and then turning such housing part back a predetermined number of revolutions. However, as can readily be appreciated, such a process is practically inconceivable in final assembly steps in the case of mass production of, for example, motor vehicles.

The aim underlying the present invention essentially resides in providing an electrically conducting connector adapted to be disposed between mutually rotatable components which makes possible the rapid and correct installation of the connector in a final assembly process.

In accordance with advantageous features of the present invention, an electrically conducting connector for mutually rotatable components is provided wherein an axial electrically conductive contact ring is respectively located on the outer side of the core of the first housing part and on the inner side of the second housing part, with the spiral spring slidingly resting against one of the contact rings under a spring tension by means of each of its two end regions.

By virtue of the above noted features of the present invention, an electrically conducting connector is provided which allows the spiral spring to be installed in a position with any direction of rotation. More particularly, with, for example, a steering wheel of a motor vehicle steering assembly, when the steering wheel has been turned as far as each end stop, the spiral spring has centered itself by sliding its end regions on the contact rings and then the spring, in future operation, works practically without a slipping of the spring ends.

It is also possible in accordance with the present invention, to increase the spring tension and, for this purpose, a clamping ring and a spreading ring may be provided which act on the end regions of the spiral spring.

When two spiral spring systems are employed, it is also advantageous to prevent a resultant moment from acting on the steering wheel and, for this purpose, the two spiral springs may be installed and wound in opposite directions to one another.

Since a region of the spiral spring near an inner spring end is subjected to pressure when virtually the entire spring length is located on the outside and the core nevertheless continues to rotate, it is also possible in accordance with the present invention, for a region of the spiral spring, which is near the inner spring end and which is no longer stressed by the clamping ring surrounding only part of the periphery of the core, is cambered toward the center of the spring width. As a result of this measure, the stiffness, in compression, of this region in a straight line position is substantially increased while, on the other hand, there is no detectable increase in the bending moment.

Accordingly, it is an object of the present invention to provide an electrically conducting connector for mutually rotatable components which avoids, by simple means, shortcomings and disadvantages encountered in the prior art.

Another object of the present invention resides in providing an electrically conducting connector for mutually rotatable components which ensures a transmission of an electrical current in any position of the respective components.

Yet another object of the present invention resides in providing an electrically conducting connector for mutually rotatable components which enables a rapid and correct installation.

A further object of the present invention resides in providing an electrically conducting connector for mutually rotatable components which is simple in construction and therefore relatively inexpensive to manufacture.

These and other objects, features, and advantages of the present invention will become more apparent from the following description when taken in connection with the accompanying drawings which show, for the purpose of illustration only, one embodiment in accordance with the present invention, and wherein.

Figure 1:
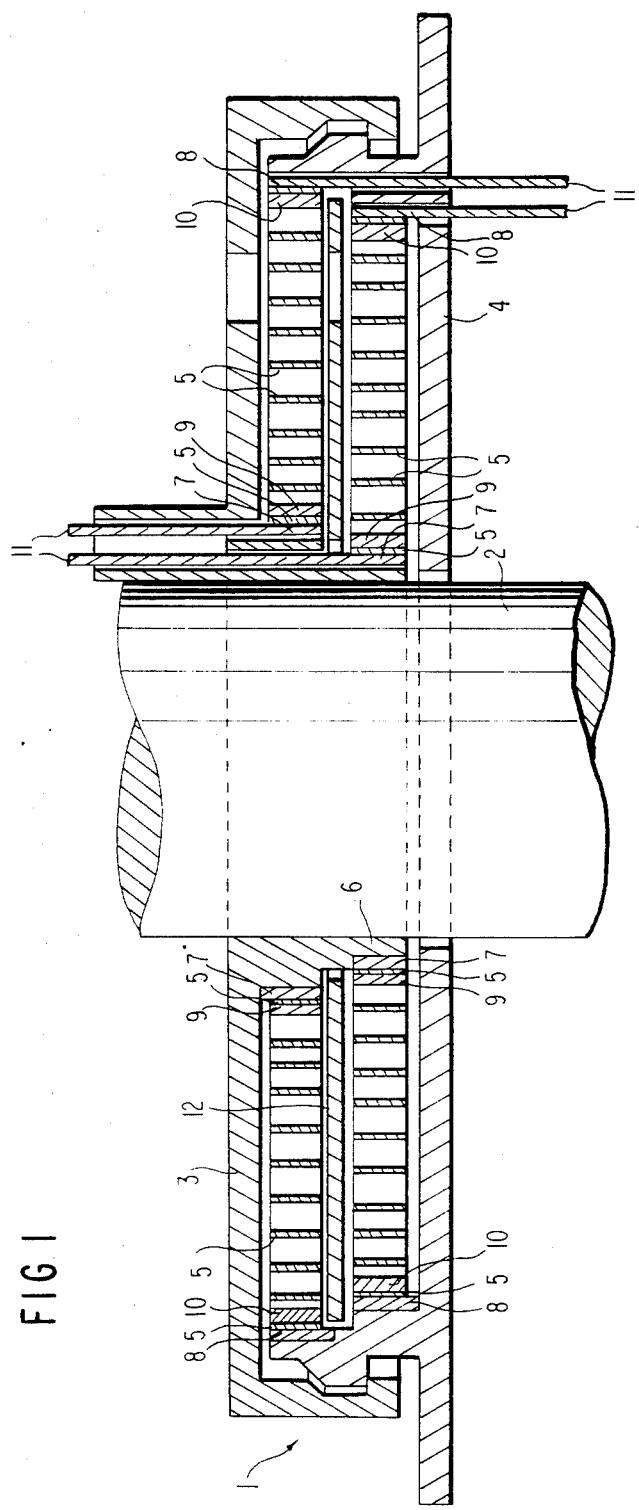
FIG. 1 is a vertical cross sectional view through an electrically conducting connector constructed in accordance with the present invention arranged in a region of a steering wheel of a motor vehicle.

Referring now to the drawings wherein like reference numerals are used throughout the various views to designate like parts and, more particularly, to FIG. 1, according to this Figure, an electrically conducting connector for mutually rotatable components includes a bipartite housing generally designated by the reference numeral 1 which includes a first or upper housing part 3 connected to a shaft 2, preferably a steering shaft of a motor vehicle, so as to be rotatable therewith, and a second or lower housing part 4 fixed with respect to the rotatable housing part 3. The rotatable housing part 3 is preferably connected to a steering wheel (not shown) with the second or lower housing part 4 being connected to a steering column jacket (not shown) of a steering assembly.

The first and second housing parts 3, 4 are offset radially and axially with respect to one another, and a spiral spring 5 is accommodated in each of the two regions of the first and second housing parts 3, 4. The spiral spring 5 is fashioned of an electically conductive material and rests, under a spring tension, by means of an inner end region thereof against the contact ring 7 attached to a core 6 of the first or upper housing part 3 and, by means of its outer end region against a contact ring 8 inserted into the second or lower housing part 4 so that it is possible for the end regions to slide on the associated contact rings 7,8.

To increase the clamping effect, the inner end region of each spiral spring 5 may be stressed by a clamping ring 9 and an outer end region by a spreader ring 10. The clamping rings 9 and spreader rings 10 are constructed so that they respectively surround the corresponding regions of the spiral springs over less than 360°.

The axial contact rings 7, 8 are respectively connected to cable terminals 11, with an insulating intermediate plate 12 being disposed between the two spiral springs 5 accommodated in the respective housing parts 3, 4.

Figure 4:
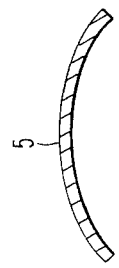
FIG. 4 is a cross sectional view, on an enlarged scale, taken along the line IV—IV in FIG. 2.
Figure 3:
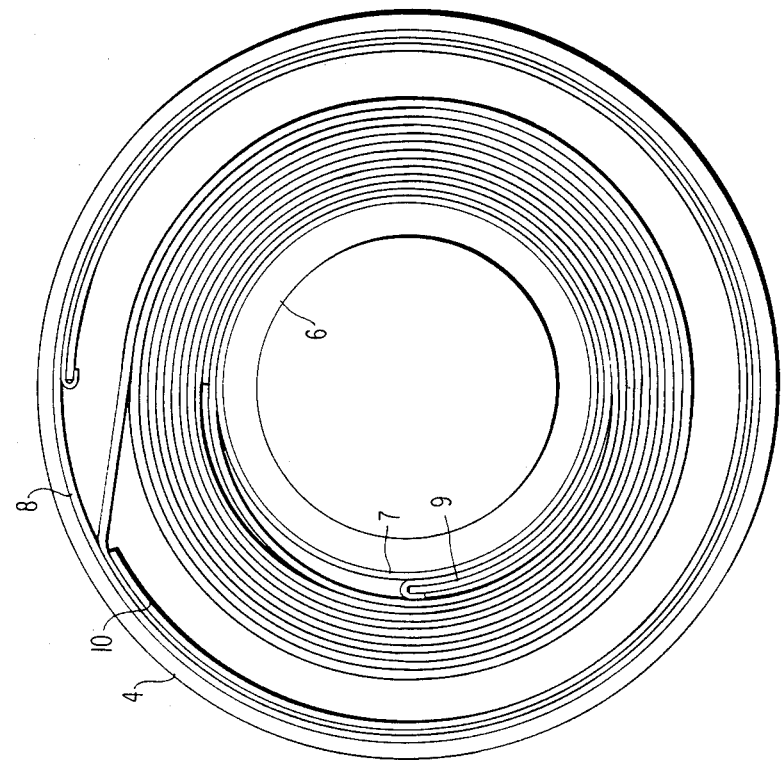
FIG. 3 is a plan view of a spiral spring system of an electrical conducting connector constructed in accordance with the present invention in a different spring position.
Figure 2:
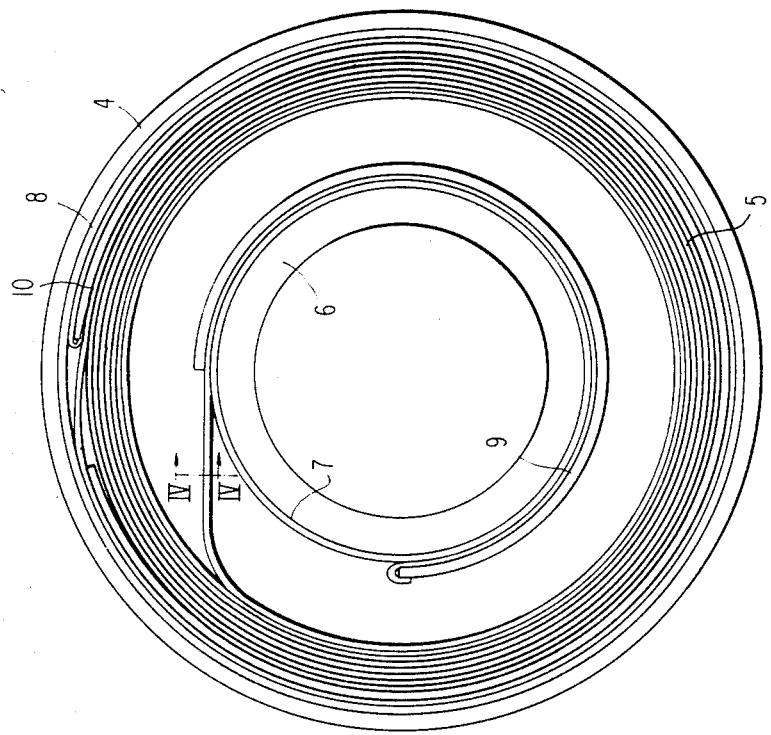
FIG. 2 is a plan view of a spiral spring system of the electrical conducting connector constructed in accordance with the present invention in one spring position.

FIGS. 2 and 3 provide an example of operating positions of the electrically conducting connector of the present invention and represents essentially the two end positions of a steering assembly. In a straight line region of the spiral spring, illustrated in FIG. 2, and through which the section of FIG. 4 is taken, the spiral spring 5 is cambered in order to increase the stiffness in compression without a substantial change in the bending moment.

While We have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An electrically conducting connector for mutually rotatable components, the connector including a housing means formed of a first and second housing part, at least one spiral spring means formed of an electrically conductive material accommodated in the housing means, a core means provided on one of the housing parts for forming a winding for the at least one spiral spring means, one of the housing parts is mounted to one of the mutually rotatable components for rotation therewith, the other housing part is mounted on another of the mutually rotatable components so as to be fixed with respect to the rotatable housing part, characterized in that at least one first electrically conductive contact means is arranged on an outer periphery of the core means of said one of said housing parts, at least one second electrically conductive contact ring means is disposed on an inner side of at least the other of said housing parts, and in that an inner and outer region of the spiral spring means respectively sliding rest under a spring tension against the first and second contact ring means, means are provided for increasing the spring tension at least in the inner and outer end regions of the spiral spring means, wherein the means for increasing the spring tension includes a clamping ring means adapted to act upon the inner end region of the spiral spring means and a spreader ring means adapted to act upon the outer end region of the spiral spring means.

2. An electrically conducting connector for mutually rotatable components, the connector including a housing means formed of a first and second housing part, at least one spiral spring means formed of an electrically conductive material accommodated in the housing means, a core means provided on one of the housing parts for forming a winding for the at least one spiral spring means, one of the housing parts is mounted to one of the mutually rotatable components for rotation therewith, the other housing part is mounted on another of the mutually rotatable components so as to be fixed with respect to the rotatable housing part, characterized in that at least one first electrically conductive contact means is arranged on an outer periphery of the core means of said one of said housing parts, at least one second electrically conductive contact ring means is disposed on an inner side of at least the other of said housing parts, and in that an inner and outer region of the spiral spring means respectively slidingly rest under a spring tension against the first and second contact ring means, means are provided for increasing the spring tension at least in the inner and outer end regions of the spiral spring means, wherein the means for increasing the spring tension includes a clamping ring means adapted to act upon the inner end region of the spiral spring means and a spreader ring means adapted to act upon the outer end region of the spiral spring means, and wherein the clamping ring means surrounds only a portion of a periphery of the core means, and a portion of the spiral spring means in a region of the spring end unstressed by the clamping ring means is cambered in a direction of a width of the spiral spring means.

3. An electrically conducting connector for mutually rotatable components, the connector including a housing means formed of a first and second housing part, at least one spiral spring means formed of an electrically conductive material accommodated in the housing means, a core means provided on one of the housing parts for forming a winding for the at least one spiral spring means, one of the housing parts is mounted to one of the mutually rotatable components for rotation therewith, the other housing part is mounted on another of the mutually rotatable components so as to be fixed with respect to the rotatable housing part, characterized in that at least one first electrically conductive contact means is arranged on an outer periphery of the core means of said one of said housing parts, at least one second electrically conductive contact ring means is disposed on an inner side of at least the other of said housing parts, and in that an inner and outer region of the spiral spring means respectively slidingly rest under a spring tension against the first and second contact ring means, at least two spiral spring means are provided and are respectively accommodated in the first and second housing parts, the core means of said one of said housing parts extends axially into the other of said housing parts t core means for said other of said housing parts, a pair of the first electrically conductive contact ring means is provided on the outer periphery of the core means in an area of the respective housing parts, a pair of the second electrically conductive contact ring means is provided with each of the second electrically conductive contact ring means being respectively disposed on an inner side of each of said housing parts, the inner and outer end regions of each of the spiral spring means respectively sealingly rest under a spring tension against the associated first and second elastically conductive ring means, and in that the first and second housing parts are arranged so as to be axially and radially offset with respect to one another, an insulating plate means is arranged between the respective spiral spring means so as to separate the spiral spring means in an axial direction, means are provided for increasing the spring tension of each of the spiral spring means at least in the inner and outer regions thereof, the means for increasing the spring tension includes clamping ring means provided for each of the spiral spring means and adapted to act upon the inner end regions of the associated spiral spring means, and spreader ring means provided for each of the spiral spring means and adapted to act upon the outer end region of the associated spiral spring means.

4. An electrically conducting connector for mutually rotatable components, the connector including a housing means formed of a first and second housing part, at least one spiral spring means formed of an electrically conductive material accommodated in the housing means, a core means provided on one of the housing parts for forming a winding for the at least one spiral spring means, one of the housing parts is mounted to one of the mutually rotatable components for rotation therewith, the other housing part is mounted on another of the mutually rotatable components so as to be fixed with respect to the rotatable housing part, characterized in that at least one first electrically conductive contact means is arranged on an outer periphery of the core mean of said one of said housing parts, at least one second electrically conductive contact ring means is disposed on an inner side of at least the other of said housing parts, and in that an inner and outer region of the spiral spring means respectively slidingly rest under a spring tension against the first and second contact ring means, at least two spiral spring means are provided and are respectively accommodated in the first and second housing parts, the core means of said one of said housing parts extends axially into the other of said housing parts to form a core means for said other of said housing parts, a pair of the first electrically conductive contact ring means is provided on the outer periphery of the core means in an area of the respective housing parts, a pair of the second electrically conductive contact ring means is provided with each of the second electrically conductive contact ring means being respectively disposed on an inner side of each of said housing parts, the inner and outer end regions of each of the spiral spring means respectively sealingly rest under a spring tension against the associated first and second elastically conductive ring means, and in that the first and second housing parts are arranged so as to be axially and radially offset with respect to one another, an insulating plate means is arranged between the respective spiral spring means so as to separate the spiral spring means in an axial direction, the respective spiral spring means are installed wound in opposite directions to one another, means are provided for increasing the spring tension of each of the spiral spring means at least in the inner and outer regions thereof, the means for increasing the spring tension includes clamping ring means provided for each of the spiral spring means and adapted to act upon the inner end regions of the associated spiral spring means, and spreader ring means provided for each of the spiral spring means and adapted to act upon the outer end region of the associated spiral spring means, the respective clamping means surrounds only a portion of a periphery of the core means, and a portion of the respective spiral spring means in a region of the inner spring end unstressed by the clamping ring means is cambered in a direction toward a center of a width of the respective spiral spring means.

* * * * *